United States Patent [19]

Stepp

[11] 4,324,061
[45] Apr. 13, 1982

[54] CASTING NET HOLDING DEVICE

[76] Inventor: Jesse W. Stepp, Rte. 5, Box 1023, Brunswick, Ga. 31520

[21] Appl. No.: 163,562

[22] Filed: Jun. 27, 1980

[51] Int. Cl.³ .............................................. A01K 75/00
[52] U.S. Cl. ................................................ 43/4.5; 43/8
[58] Field of Search ................. 43/7, 8, 14, 4, 4.5; 224/202, 208, 265, 268

[56] References Cited

U.S. PATENT DOCUMENTS

| | | | |
|---|---|---|---|
| 409,239 | 8/1889 | Roller | 224/268 X |
| 1,024,653 | 4/1912 | Sargent. | |
| 2,491,008 | 12/1949 | Lake | 43/4 X |
| 2,578,237 | 12/1951 | Geistweit | 224/5 |
| 2,615,649 | 10/1952 | Flewelling | 43/4 X |
| 2,723,481 | 11/1955 | Schwartz, Sr. | 43/7 |
| 2,738,909 | 3/1956 | Shadoin | 224/202 |
| 2,856,111 | 10/1958 | Wolfe | 224/268 |
| 3,151,790 | 10/1954 | Mavrakis | 224/5 |
| 4,061,387 | 12/1977 | Linbergh | 43/8 |

Primary Examiner—Jimmy C. Peters
Attorney, Agent, or Firm—Fleit & Jacobson

[57] ABSTRACT

A fisherman's casting net holder consisting of a plate, an arcuate horn attached to the front of the plate, and a device for adjustably carrying the plate on the chest portion of the caster's body. To prepare for a cast, the holder is strapped onto the caster so that the plate is held against the caster's body and so that the horn points away from the caster's body. Then the caster coils the net's hand line in one hand, places a portion of the net's weight line over the horn, holds a portion of the net in his or her other hand, and then casts in the customary manner, except that the caster need not use his or her mouth to hold a portion of the net's weight line during casting, such portion being held by the horn until such time as release is appropriate whereupon release is effected automatically, without any effort on the part of the caster.

4 Claims, 5 Drawing Figures 4,324,061

CASTING NET HOLDING DEVICE

BACKGROUND OF THE INVENTION

1. Field of the Invention

This invention relates to the field of fishing tackle, in general, and to bodily-worn casting net holding devices and method of use, in particular.

2. Description of the Prior Art

Many persons who practice the sport or business of catching fish, shrimp, bait and other marine life often use various types of casting nets to harvest their catch. Such casting nets and methods of use are well known in the art. See, for example, U.S. Pat. No. 2,723,481 which describes a fisherman's casting net and a common method of casting the net.

As well known to those skilled in the art, when casting, the caster coils the net's hand line in one hand, holds a portion of the weight line in his or her mouth, and bundles a portion of the net on his or her other arm. The caster then swings the net and casts it in such a manner that the net spreads out upon the water and sinks. The hand line is then pulled upon for hauling in the net and its catch.

During net casting, the caster must release that portion of the weight line held by his or her mouth in a timely manner to effect appropriate spread of the net upon the water for successful cast. Additionally, any untimely release may result in damage to or removal of the caster's teeth or denture work.

Even with timely weight line release from the caster's mouth, repetitive casting causes mouth fatigue, jaw structure fatigue, sore and abraded lips, etc.

Additionally, foreign matter, such as mud, sand and water, carried by the net or its weight line may be introduced into the caster's mouth during conventional net casting causing displeasure and discomfort to the caster.

During conventional net casting, when the caster's mouth is being utilized as a net holding device, there is little additional use to which the caster may put his or her mouth; therefore, conversing with other persons, enjoying tobacco products (for those who indulge), etc., is limited.

From the foregoing considerations, it should be apparent that there is a great need for a casting net holding device which will relieve the caster from using his or her mouth as a net holder, which is simple in use, and which is simple in manufacture. The subject invention is directed to just such a net holding device and method of use.

SUMMARY OF THE INVENTION

The subject invention relates to a novel casting net holding device which may be supported by the caster during casting operations and which temporarily holds a portion of the net.

The holding device consists of a plate, a horn attached to one side of the plate, and means for adjustably carrying the plate on the caster's body, such as by line or strap or by connection to a garment worn by the caster.

In use, the holding device is worn by the caster with the plate being positioned on the caster's front torso and with the horn pointing away from the caster's body. The caster then coils the net's hand line in one hand and bundles a portion of the net on his other arm, as done in the conventional manner; however, instead of holding a portion of the weight line in his or her mouth, the caster simply places a portion of the weight line over the horn portion of the holding device and casts the net in a manner similar to the conventional one. During the cast, the weight line held by the horn slides off the horn in a timely manner to effect a successful cast.

It is, thus, an object of the present invention to provide a bodily-worn casting net holder which will assist a caster during casting operations.

Another object of the present invention is to provide a casting net holder which avoids the need for the caster to use his or her mouth to hold a portion of the net's weight line during casting, thereby eliminating possible damage to or loss of teeth or denture work, eliminating mouth and jaw structure fatigue and mouth abrasion, eliminating the introduction of foreign matter into the caster's mouth from the net or weight line, and allowing the caster to ulitize his or her mouth during casting for other purposes.

A further object of the present invention is to provide a casting net holder which simplifies the casting operation by automatically releasing a portion of the weight line held by the holder at the proper time for a successful cast.

It is still a further object of the present invention to provide a casting net holder which is simple and economical to manufacture.

Still another object of the present invention is to provide a casting net holder which is simple to use.

Yet another object of the present invention is to provide a casting net holder which is adjustable for proper fit by any size caster.

Other objects and features of this invention will further become apparent hereinafter and with reference to the accompanying drawings.

DESCRIPTION OF THE PREFERRED EMBODIMENT

Figure 1:
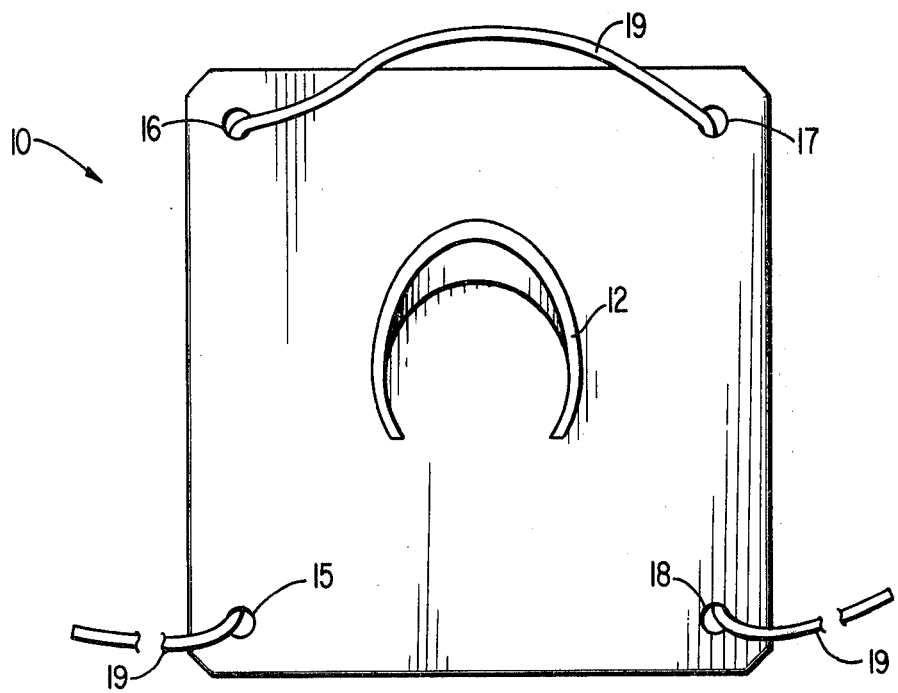
FIG. 1 is a front view of the casting net holding device.
Figure 2:
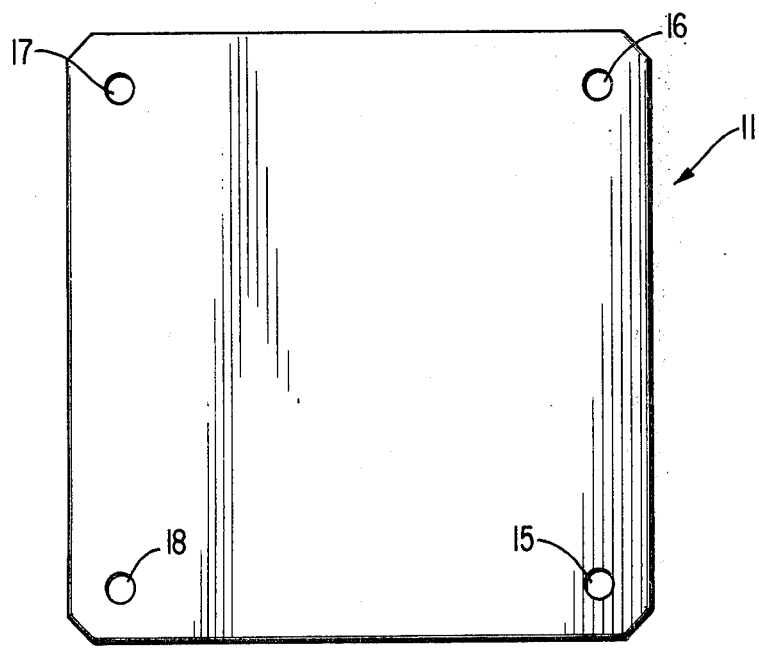
FIG. 2 is a rear view of the casting net holding device shown in FIG. 1 with line or strap 19 removed to show holes 15, 16, 17 and 18.

The subject invention will now be described with reference to the drawings, in which FIG. 1 illustrates a preferred embodiment of a casting net holding device (hereinafter sometimes referred to as "net holder") generally designated by the number 10.

As shown in FIG. 1, net holder 10 includes plate 11 having holes 15, 16, 17 and 18; an arcuate horn 12; and line or strap 19.

Plate 11 and horn 12 are made from rigid material, such as wood, metal, plastic or other suitable material. Line or strap 19 is made from fiber (such as nylon or cotton), plastic strapping, or other suitable material.

Figure 3:
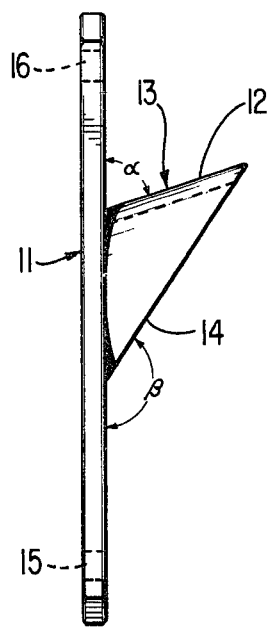
FIG. 3 is a right side view of the casting net holding device shown in FIG. 2.
Figure 4:
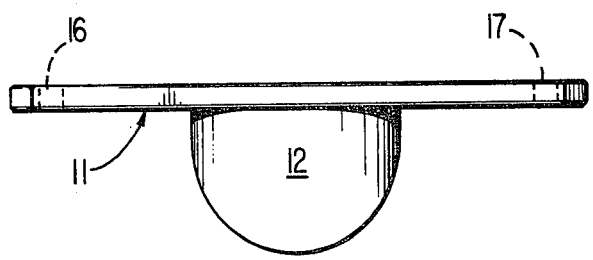
FIG. 4 is a top view of the casting net holding device shown in FIG. 2.

As shown in FIGS. 1, 3 and 4, horn 12 is located on the front side of plate 11, preferably having its center located on a center line equidistant from the left and right sides of the front of plate 11 and in the upper half of the plate.

Upper ridge line 13 on the top portion of horn 12 forms an acute angle $\alpha$ with the front of plate 11 as shown in FIG. 3, this acute angle $\alpha$ being on the order of 81° in a preferred embodiment of the net holder.

Profile line 14 on the outer portion of horn 12 forms an obtuse angle $\beta$ with the front of plate 11 as illustrated in FIG. 3, this obtuse angle $\beta$ being on the order of 119° in a preferred embodiment of the net holder.

Angles $\alpha$ and $\beta$ may vary from 81° and 119°, respectively, as long as net holder 10 holds and releases, at the appropriate time in a cast, the weight line of a casting net as is more fully described below.

Line or strap 19 is of a suitable length sufficient to be adjustably engaged with plate 11 and to be worn around portions of the caster's body as is more fully described below.

As partially shown in FIG. 1, line or strap 19 runs through hole 15 from the front of plate 11 to its back, up along back of plate 11 to and through hole 16 to the front of plate 11, across the front of plate 11 to and through hole 17 to the back of plate 11, down along the back of plate 11 to and through hole 18 ending in front of plate 11.

Figure 5:
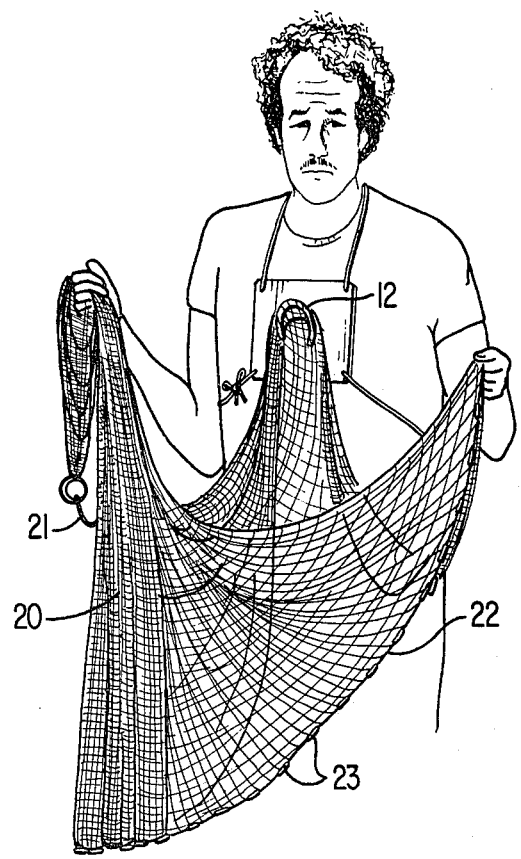
FIG. 5 is a view of the casting net holding device shown in FIG. 1 while in use by a caster.

In use, net holder 10 is worn on the caster's front torso with the back of plate 11 resting against the caster's body as shown in FIG. 5.

Net holder 10 is secured to the caster's body by adjusting line or strap 19 so that sufficient line extends between holes 16 and 17 of plate 11 to allow the caster to place his or her head through the opening formed by the extended line 19 and the top of plate 11 (see FIG. 1).

The caster then places his or her head through the opening and adjusts line or strap 19 so that plate 11 hangs from the caster's neck and adjacent to the caster's front torso. Preferably, line or strap 19 of net holder 10 should be adjusted so that a point on upper ridge line 13 of horn 12 is approximately 3 to 4 inches below the caster's chin.

Next, one end of line or strap 19, which extends from either hole 15 or 18, is brought under the arms of the caster, around his or her back, and is connected to line or strap 19's opposite end to hold plate 11 against the caster's front torso. The two ends may be connected by any suitable coupling means, such as by knot, buckle, snap, and the like.

Additionally, as desired by the caster, line or strap 19 may be adjusted for connecting its ends on the right side of plate 11 as shown in FIG. 5 or on the left side of plate 11.

After net holder 10 is positioned on the caster as described above, the casting procedure is as follows. The caster takes up any conventional casting net 20 and coils the net's hand line 21, ultimately picking up the net by the top (tuck line ring). The net then is draped over one hand, and a portion of the weight line 22 (holding weights 23) is grasped with the other hand. The so held portion of the weight line 22 then is placed over the upper portion of horn 12. With one hand still holding the draped net, the free hand grasps another portion of the weight line 22. This position of the caster is illustrated in FIG. 5.

Casting then is completed in a conventional manner, except that the caster uses net holder 10 to hold a portion of net 20 instead of using his or her mouth.

During casting, weight line 20 automatically slips off horn 12 at the appropriate time.

Obviously, many modifications and variations of the present invention are possible in light of the above teachings. For example, it is contemplated that the plate of the net holder may be of different design and arrangement; likewise, the horn of the net holder may be of different design and arrangement; the position of the horn on the plate may vary; and the net holder may be mounted on the caster's body by means other than lines or straps, such as by being connected to a garment worn by the caster. It is, therefore, to be understood that within the scope of the appended claims, the invention may be practiced otherwise than as specifically described.

What is claimed:

1. A net holder device for temporarily holding a portion of a casting net during casting operations, said net holder device comprising:
    a plate;
    means located on said plate for temporarily supporting a portion of the casting net during casting operations comprising an arcuate horn and a top portion of said horn, said top portion joining said plate at an acute angle, said horn being adapted to release said portion of said casting net during casting without any active intervention on the part of the caster; and
    means for carrying said plate on the caster's body.

2. The net holder according to claim 1, wherein said carrying means comprises a line and means for engaging said line with said plate, said line being threaded through said plate.

3. The net holder according to claim 1, wherein said carrying means is adjustable whereby said net holder may be appropriately positioned on the caster's body and held against said body.

4. A method of using a casting net holding device when casting with a casting net having a net portion, a hand line and a weight line, said holding device comprises: a plate, means located on said plate for temporarily supporting a portion of the casting net during casting operations, and means for carrying the plate on the caster's body; the method comprising the steps of:
    mounting said net holding device on the body of the caster;
    coiling a portion of the hand line of said net;
    holding said coiled portion of said hand line in one hand;
    draping a portion of the weight line of said net over said net supporting means;
    supporting a portion of said net in the other hand; and
    casting said net by swinging it in such a manner that said net spreads out upon the water, the spreading of said net causing said weight line to free itself from said net supporting means without any active intervention on the part of the caster.

* * * * *